United States Patent
Chan (10) Patent No.: US 9,150,232 B2
(45) Date of Patent: Oct. 6, 2015

(54) HANDLING AND TRANSPORT SYSTEM (76) Inventor: Weng Seong Chan, Singapore (SG)

( * ) Notice: Subject to any disclaimer, the term of this patent is extended or adjusted under 35 U.S.C. 154(b) by 288 days.

(21) Appl. No.: 13/981,266

(22) PCT Filed: Jan. 25, 2011

(86) PCT No.: PCT/SG2011/000034
§ 371 (c)(1),
(2), (4) Date: Jul. 23, 2013

(87) PCT Pub. No.: WO2012/102671
PCT Pub. Date: Aug. 2, 2012

(65) Prior Publication Data
US 2013/0291757 A1  Nov. 7, 2013

(51) Int. Cl.
*B62B 3/00* (2006.01)
*B61B 13/00* (2006.01)
*B61C 13/00* (2006.01)
*B62B 3/10* (2006.01)
*B61B 10/00* (2006.01)
*B62B 5/00* (2006.01)
*B65G 49/06* (2006.01)

(52) U.S. Cl.
CPC ................. *B62B 3/009* (2013.01); *B61B 10/00* (2013.01); *B61B 13/00* (2013.01); *B61C 13/00* (2013.01); *B62B 3/108* (2013.01); *B62B 3/008* (2013.01); *B62B 5/0063* (2013.01); *B62B 2202/62* (2013.01); *B65G 49/062* (2013.01)

(58) Field of Classification Search
CPC ........ B62B 3/009; B62B 3/108; B62B 3/008; B62B 5/0063; B62B 2202/62; B61B 10/00; B61B 13/00; B61C 13/00; B65G 49/062
See application file for complete search history.

(56) References Cited

U.S. PATENT DOCUMENTS

| 2,681,233 | A | * | 6/1954 | Smith | 280/79.7 |
| 4,679,805 | A | * | 7/1987 | Cunningham | 280/33.991 |
| 6,585,224 | B1 | * | 7/2003 | Schmidt | 248/640 |
| 7,004,483 | B1 | * | 2/2006 | McEntee | 280/47.35 |
| 2013/0291757 | A1 | * | 11/2013 | Chan | 104/140 |

* cited by examiner

*Primary Examiner* — Jason C Smith
(74) *Attorney, Agent, or Firm* — D. Peter Hochnerg; Sean F. Mellino (57) ABSTRACT

A slab handling device for facilitating movement of slabs around a facility is presented. The slab handling device includes a base frame disposed horizontally in parallel to a floor surface, wherein a first end of the base frame comprises a projection extending from the base frame. The base frame hosts a second frame disposed vertically on the base frame to form a viewing side and a stacking side. Pluralities of side wheels are coupled to the base frame, wherein the diameter of the plurality of track wheels is greater than the diameter of the plurality of side wheels. A first set of end stoppers are disposed on the base frame and configured to hold a slab in position on the viewing side and a second set of end stoppers are disposed on the base frame and configured to hold multiple slabs in place on the stacking side.

9 Claims, 6 Drawing Sheets

HANDLING AND TRANSPORT SYSTEM

CROSS-REFERENCE TO RELATED APPLICATIONS

This application is a U.S. National Stage application of International Application No. PCT/SG2011/000034, filed on Jan. 25, 2011, which is incorporated herein by reference in its entirety.

FIELD OF THE INVENTION

The present invention is in the field of transportation devices. In particular, the present invention relates to an improved handling device for transporting of slabs such as stone, steel and such heavy objects of various sizes and weights.

BACKGROUND OF THE INVENTION

Transporting slabs of heavy material presents particular challenge given the weight, size, and potential for breakage of hard material configured as a slab. A variety of devices are available to assist in handling and transporting large slabs of marble, granite, glass, or otherwise flat, hard, and heavy objects. A stone slab may be transported between cutting area finishing area, staging area and worksite using devices such as a wheeled cart or any other like means. However, unique problems arise when handling stone slabs due to their sheer size and weight The large and unwieldy nature of a typical slab gives rise to additional during maneuvers such as ascending inclines, negotiating corners and the like.

Stone slabs are generally supported in an upright position during transport in order to prevent breakage and to allow a proper fit through restricted spaces. In addition, breakage is more likely when a slab is carried flat, not only due to increased probability of contact with obstacles but because of the inherent weakness of a slab in the cross sectional (horizontal) direction. Although the upright position is most suitable for slab transport, the slightest tipping or urging in a lateral direction must be avoided.

Currently, carts exist that assist in dealing with the sheer weight of a stone slab. Maneuvering the stone slab over worksite obstacles while maintaining upright stability may still be problematic for such carts. Some carts, in order to handle the sheer Weight of the heaviest slab likely to be encountered are typically constructed with small diameter metal wheels. Other carts are limited by their fixed physical configuration which arises in an effort to accommodate slabs of different sizes.

In addition to the handling and transportation limitations as mentioned above, there are certain other disadvantages faced by the stone slab handling facilities such as, retrieving a single slab for display from a stack of slabs and retrieving multiple such single slabs of different variety for review and selection by customers.

In addition to the disadvantages already mentioned above, other disadvantages are known to those skilled in the art. For example, rubber tires are used as a replacement for aluminum or resin rollers, they are nevertheless disadvantageous in that they are of a solid rubber construction. Solid rubber tires are known to present many of the disadvantages as with the metal rollers in terms of leaving marks or causing physical damage especially when more delicate surfaces are encountered.

Therefore, there is a need for a slab handling system that can handle slabs and an inventory of slabs efficiently and at the same time also provide for an effective display system of slabs.

BRIEF DESCRIPTION

Briefly, a slab handling device for facilitating movement of slabs around a facility is presented. The slab handling device includes a base frame disposed horizontally in parallel to a floor surface, wherein a first end of the base frame comprises a projection extending from the base frame. The base frame includes a grid of support structures to host a second frame disposed vertically on the base frame to form a viewing side and a stacking side. The second frame comprises a plurality of vertical support members, at least two or more diagonal support members coupled to the vertical support members, and one or more horizontal members coupled to the vertical members. A plurality of track wheels are coupled to the base frame and configured to roll within a track when in motion. Pluralities of side wheels are coupled to the base frame, wherein the diameter of the plurality of track wheels is greater than the diameter of the plurality of side wheels. A first set of end stoppers are disposed on the base frame and configured to hold a slab in position on the viewing side and a second set of end stoppers are disposed on the base frame and configured to hold multiple slabs in place on the stacking side. The grid of support structures is made of hallow section to support slabs disposed thereon while the slab handling device is in motion or at rest.

In another embodiment, a slab handling and transport system presented. The slab handling and transport system includes a plurality of slab handling devices for facilitating movement of slabs around a facility. Each slab handling device comprises a base frame disposed horizontally in parallel to a floor surface, wherein a first end of the base frame comprises a projection extending from the base frame. The base frame comprises a grid of support structures to host a second frame disposed vertically on the base frame to form a viewing side and a stacking side. The second frame comprises a plurality of vertical support members, at least two or more diagonal support members coupled to the vertical support members, and one or more horizontal members coupled to the vertical members. A plurality of track wheels are coupled to the base frame and configured for rolling. Pluralities of side wheels are coupled to the base frame, wherein the diameter of the plurality of track wheels is greater than the diameter of the plurality of side wheels. A first set of end stoppers are disposed on the base frame and configured to hold a slab in position on the viewing side, and a second set of end stoppers are disposed on the base frame and configured to hold multiple slabs in place on the stacking side. The plurality of slab handling devices are coupled together to forma transport train. A track is disposed around the facility comprising a central production area, a viewing area, and a loading-unloading bay, wherein the plurality of slab handling devices are configured to move continuously on the track and around the central production area, the viewing area, and the loading-unloading bay seamlessly. The stacking side of the each slab handling device is generally aligned towards the central production area and the viewing side of the each slab handling device is generally aligned towards the viewing area.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Currently, the slab viewing and selection procedure, for example by a consumer who intends to select a marble/granite slab would have to visit a stack piled in an open yard. Such visits include traveling over long distances over foot and sometimes require safety equipment as the inventory is stored in open yards. Further, such viewing and selection process may be restricted by bad weather and often exposed to danger from the snakes and insects in the open yard. Also, such open yard may be out of reach for physically challenged consumers. Furthermore, the stack piles are arranged in domino style and often may not provide a full viewing area of the sample.

On the other hand, handling of slabs in a slab processing facility may pose certain challenges such as time consuming retrieval process of slabs for either viewing or for further processing. Present handling procedures may provide unsafe work environment for employees in slab processing facilities. Also, the stacking of slabs in domino style is inefficient in that it consumes more time in retrieval than actual processing. Stock taking and inventory management are also time consuming and inefficient.

Therefore, there is a need for a slab handling system that can handle the inventory efficiently and at the same time also provide for an effective display system as disclosed in the various embodiments of the invention.

Figure 1:
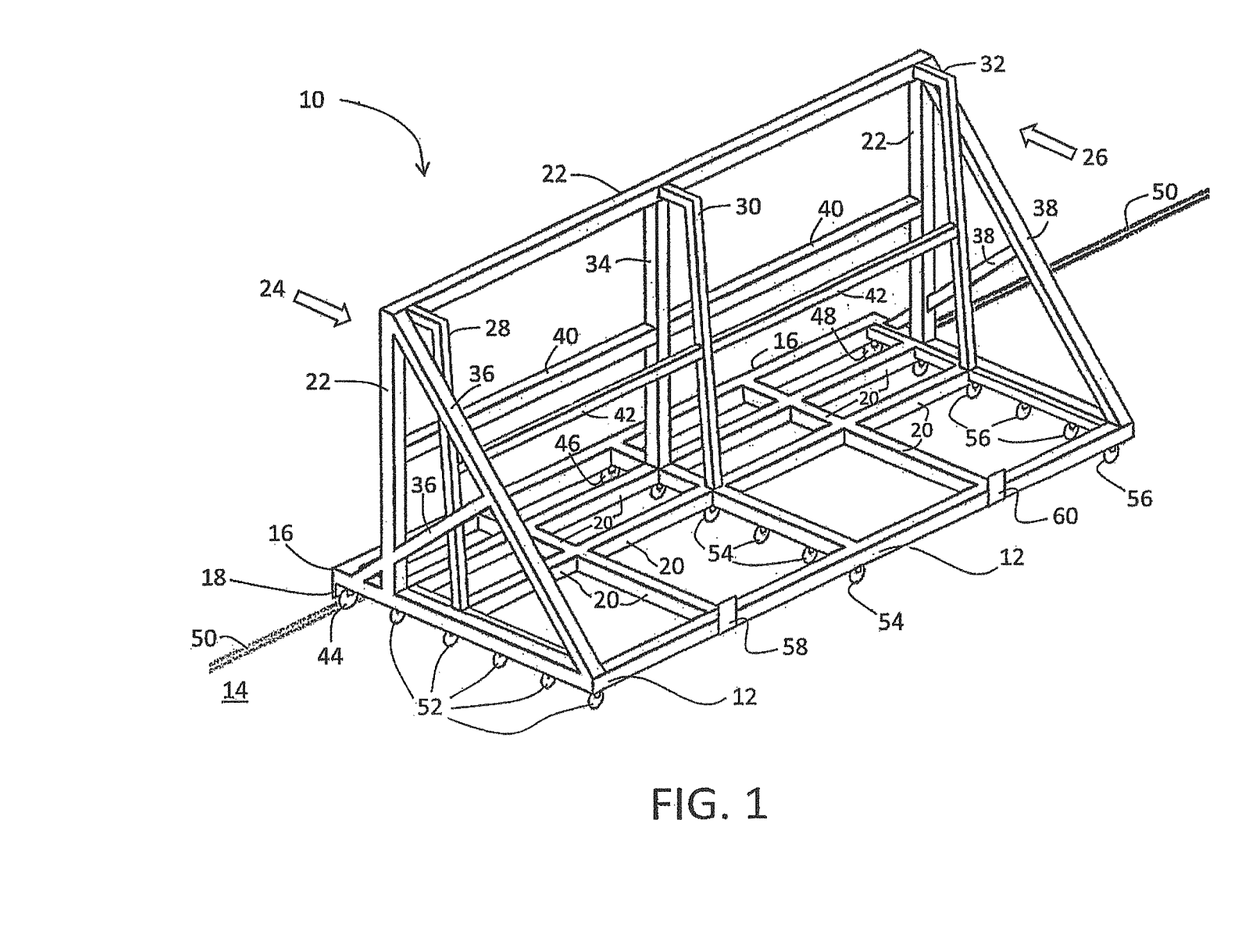
FIG. 1 illustrates an exemplary slab handling device according to an embodiment of the invention.
Figure 2:
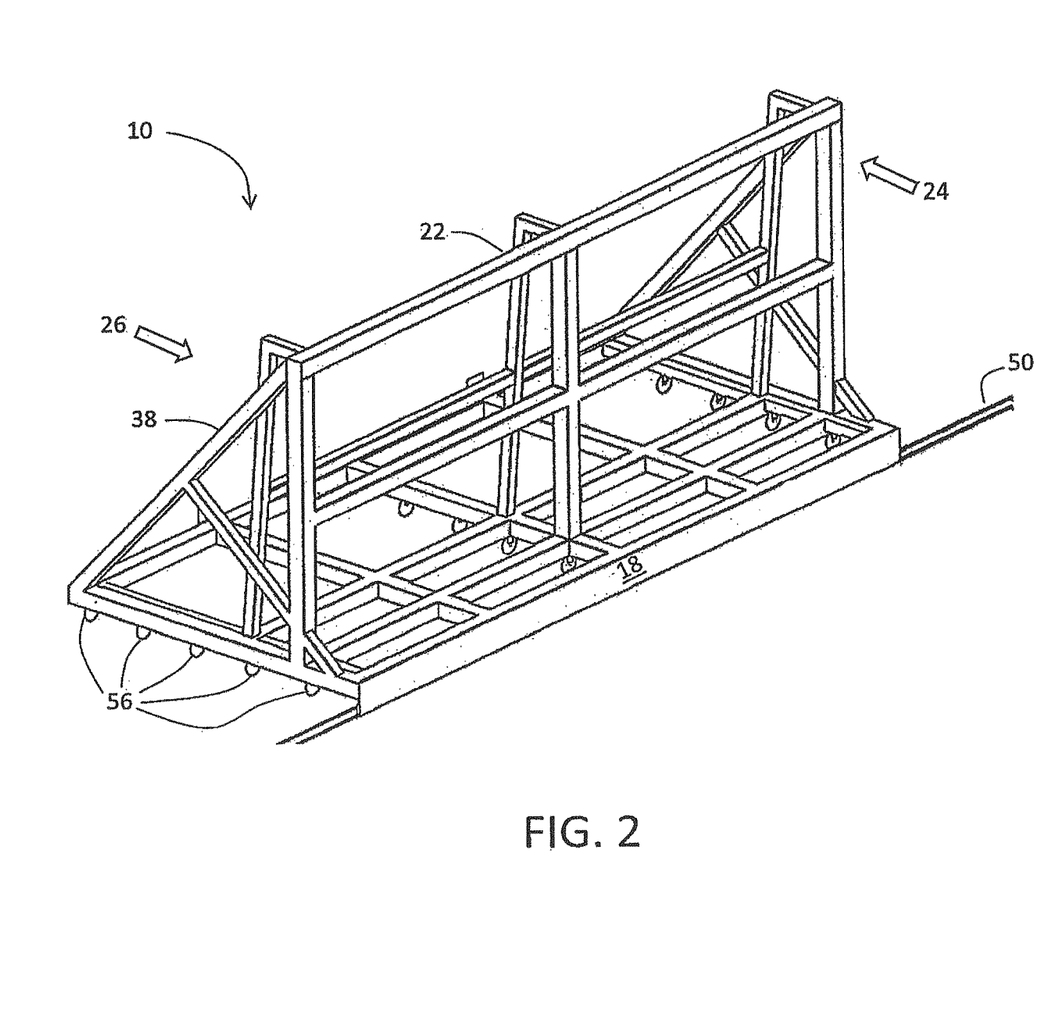
FIG. 2 illustrates another view of the exemplary slab handling device of FIG. 1.

FIG. 1 illustrates an exemplary slab handling device according to an embodiment of the invention. The exemplary slab handling device 10 is configured for facilitating movement of slabs around a facility. The slab handling device 10 includes a base frame 12 disposed horizontally in parallel to a floor surface 14. A first end 16 of the base frame 12 comprises a projection 18 extending from the base frame 12. The base frame 12 comprises a grid of support structures 20 to host a second frame 22 disposed vertically on the base frame 12 to form a viewing side 24 and a stacking side 26. Referring to FIG. 2 another view of the exemplary slab handling device 10 of FIG. 1 is illustrated. It is clear from this view that the viewing side 24 can accommodate fewer slabs compared to the stacking side 26. Referring to both FIGS. 1 and 2, the second frame 22 includes a plurality of vertical support member 28, 30, 32, 34, and at least two or more diagonal support members 36, 38 coupled to the vertical support members 28, 30, 32, 34. One or more horizontal members 40, 42 are coupled to the vertical members 28, 30, 32, 34.

A plurality of track wheels 44, 46, 48 are coupled to the base frame 12 and configured to roll within a track 50 when in motion. The track wheels are made from at least one of a heavy duty castor, or a hardened rubber. Plurality of side wheels 52, 54, 56 are coupled to the base frame 12. It may be noted that the diameter of the track wheels 44, 46, 48 is greater than the diameter of the plurality of side wheels 52, 54, 56. A first set of end stoppers 58, 60 are disposed on the base frame 12 and configured to hold a slab in position on the stacking side 26. A second set of end stoppers are disposed on the base frame 12 and configured to hold multiple slabs in place on the viewing side 24. The grid of support structures 20 are made of hallow section to support slabs disposed thereon while the slab handling device 10 in motion or at rest. It is also clear from FIG. 2 that the projection 18 disposed on the base frame 12 acts as a safety stopper for the slab handling device 10 from tripping over during an overload condition.

Figure 3:
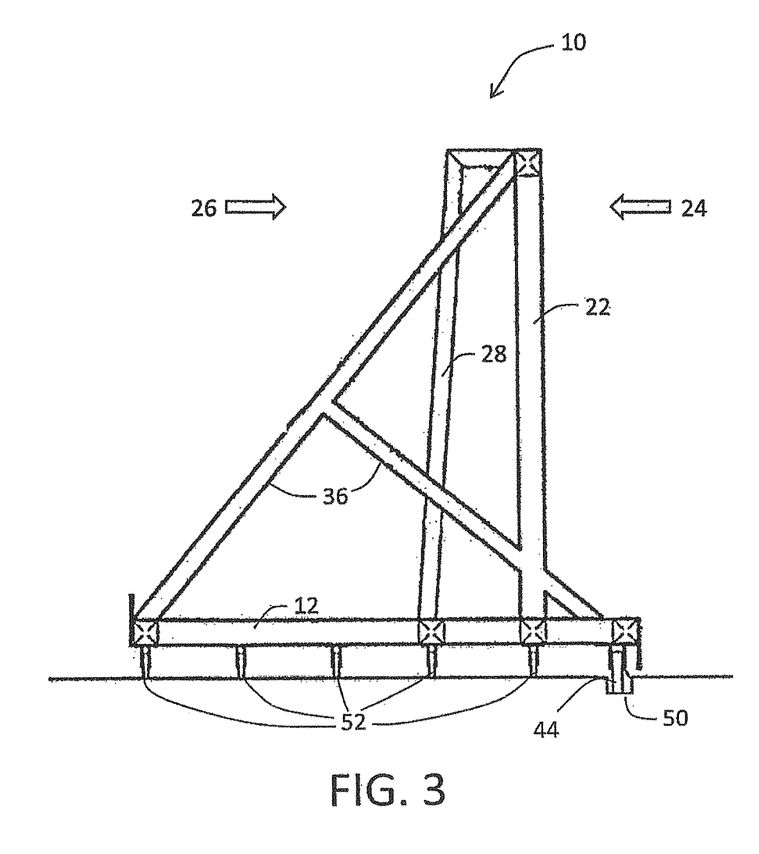
FIG. 3 illustrates a side view of the slab handling device of FIG. 1.
Figure 4:
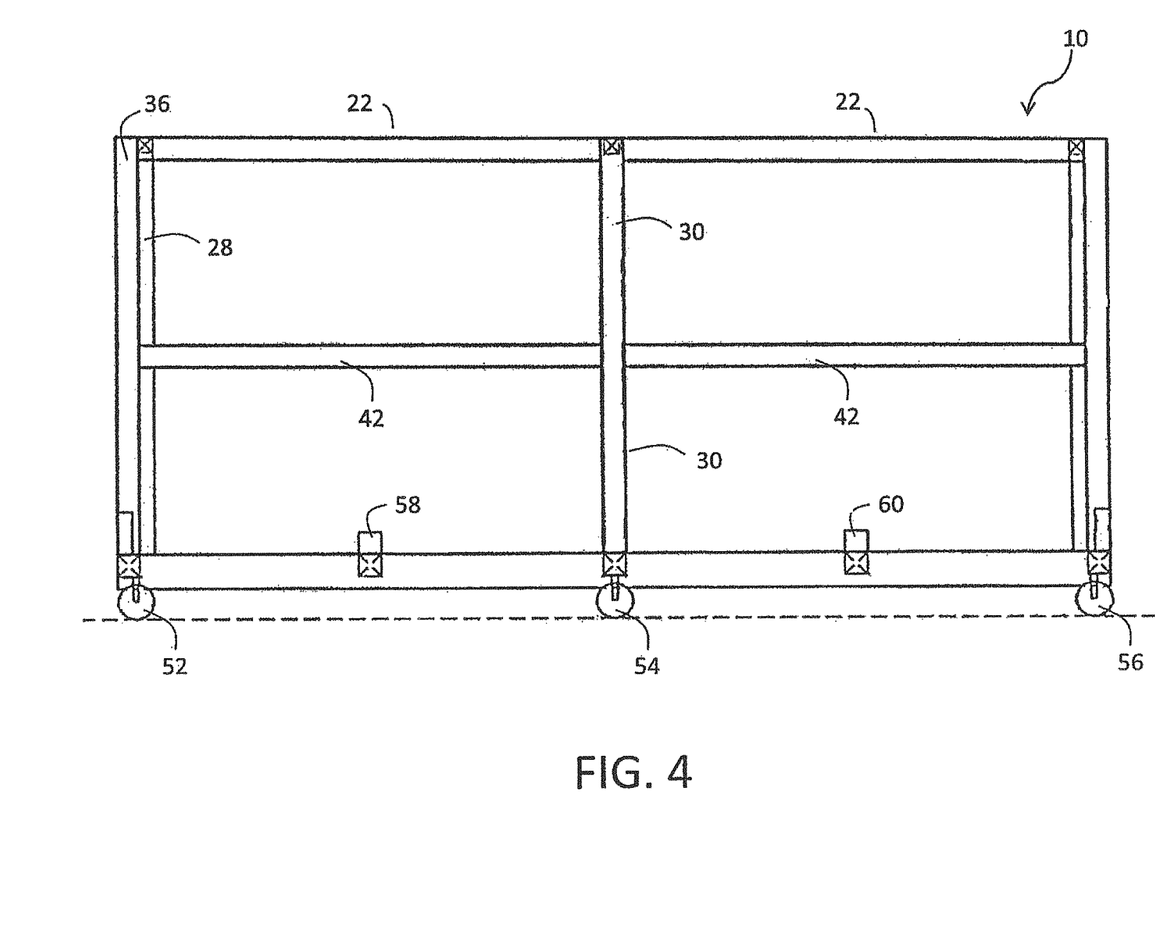
FIG. 4 illustrates a profile view of the slab handling device of FIG. 1.

FIG. 3 illustrates a side view of the slab handling device 10 of FIG. 1. It is clear from this view that the track wheel 44 is embedded within the track 50. Though an embedded trace is illustrated herein, it is envisaged that further variations of this embodiment such as but not limited to an elevated track, magnetic levitated tracks are possible. It may be noted that the track 50 is also advantageous in bringing order into the movement of inventory, which otherwise would be scattered randomly all around the storage area and work production area. FIG. 4 further illustrates another side view of the slab handling device 10 of FIG. 1.

During an operation of the slab handling device 10, slabs used in heavy industrial facilities such as but not limited to steel, stone, granite, and marble are loaded on to the stacking side 26. Referring to FIGS. 1, 2, and 3, it is clear that the stacking side accommodates more slabs as compared to viewing side 24. The stacking side 26 is generally configured for storing inventor. The viewing side 24 is generally loaded with slabs that are for viewing purpose. The finished side of the slab is arranged to face the outer side (24) such that it is easier for viewing by consumers. It may be noted that the slabs are arranged in almost upright position. Stacking the slabs in almost upright position has certain advantages such as better handling capability. For example, slabs such as marble or granite are vulnerable to breakage when handled otherwise in a flat & horizontal position. Stacking arrangement such as almost upright position provides better handling and transportation within a facility. A non-limiting example of the facility includes a stone processing, fabrication and finishing factory. The loaded slab handling device 10 may be coupled to a drive mechanism configured to move the slab handling device on the track disposed around the slab processing facility. The drive mechanism may be further configured to start and stop the slab handling device at any desired in the facility.

Figure 5:
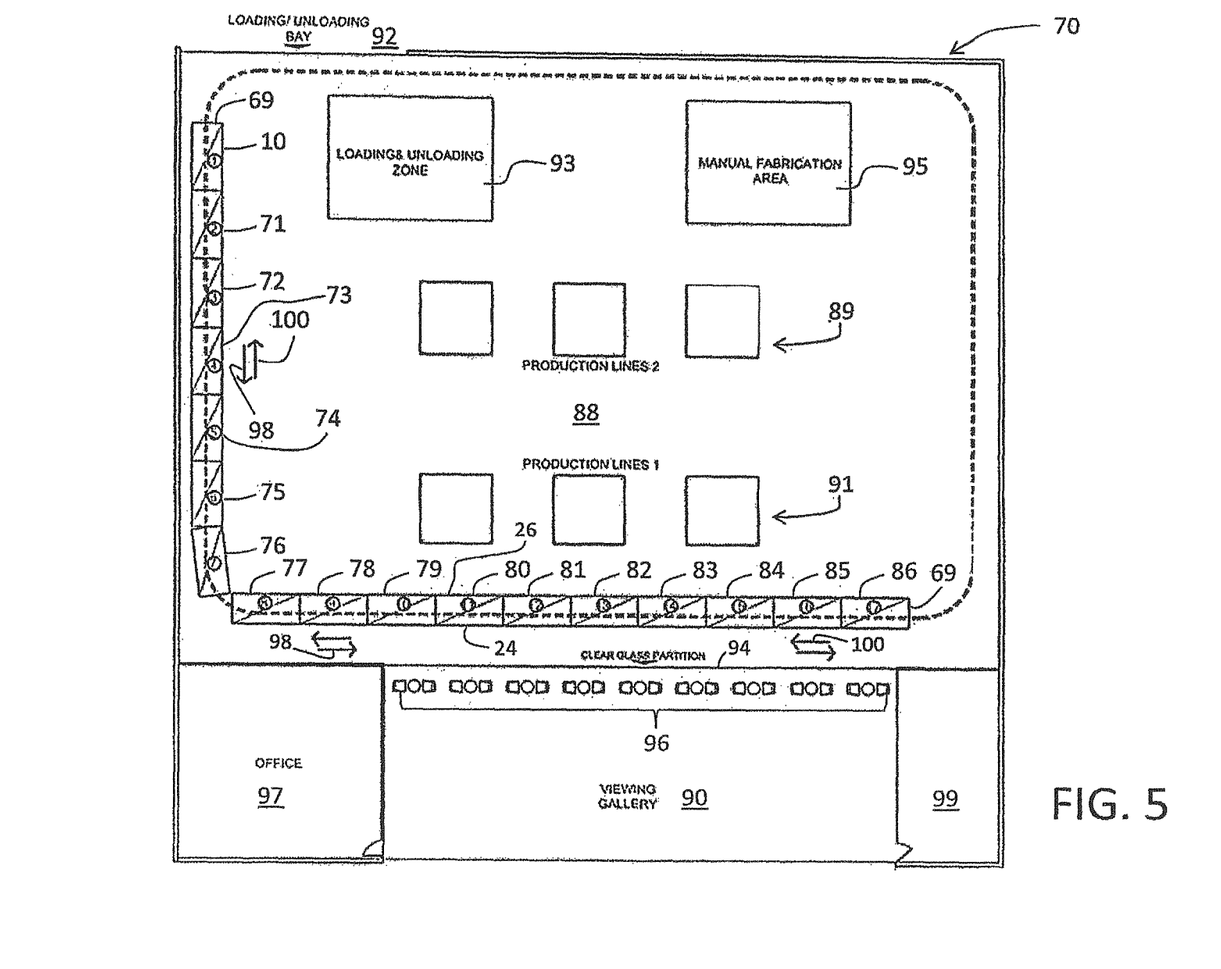
FIG. 5 is a block diagram of an exemplary slab handling and transport system according to an embodiment of the invention.

Turning now to FIG. 5, a block diagram of an exemplary slab handling and transport system is illustrated according to an embodiment of the invention. The slab handling and transport system 70 includes a plurality of slab handling devices 10, 71-86 that are coupled together to form a transport train 69. Each of the slab handling device of transport train a may include a construction similar to the slab handling device as described in FIGS. 1-4. The facility 70 in general includes a central production area 88, a viewing area 90, and a leading-unleading bay 92. The facility 70 may also include an office space 97 and other utility space 99. The central production area 88 may further include production lines 89, 91, fabrication area 95 and a loading-unloading zone 93. The plurality of slab handling devices 10, 71-86 that form the transport train 69 is configured to move continuously on the track 50 that is disposed around the facility 70. It may be noted that the stacking side 26 of the each slab handling devices 10, 71-86 is generally aligned towards the central production area 88 and the viewing side 24 of the each slab handling device is generally aligned towards the viewing area 90. A drive mechanism such as a traction motor may be coupled to a chain that is in turn coupled to the transport train 69. The drive mechanism is configured to move the transport train 69 in at least two directions such as a forward direction 98 or a reverse direction 100. The drive mechanism, for example, may be hosted at a convenient location within the facility 70.

During an operation, the drive mechanism is configured to move the transport train 69 and stop the transport train 69 at any position as desired on the track 50. For example, when new inventory arrives into the facility, the transport train 69 is moved towards the loading-unloading bay 92. An empty slab handling device is positioned at the loading-unloading zone 93 to facilitate loading of on to the slab handling device. Also, care is taken that a display slab is placed on the viewing side 24 and other slabs for storage are placed on the stacking side 26 on the slab handling device. When a customer intends to view one or more samples of the slab for selection, the transport train 69 is moved towards the viewing area 90, wherein a glass partition 94 that separates the central production area 88 and the viewing area 90 facilitates the customer for viewing at the comfort of a seating arrangement 96 in the viewing area 90. As is apparent from the illustrated block diagram of the facility 70, the transport train 69 is also used on the stacking side for retrieving inventory for production purposed in the central production area 88. The slab handling device facilitates for easy transport, storage and display of slabs.

Figure 6:
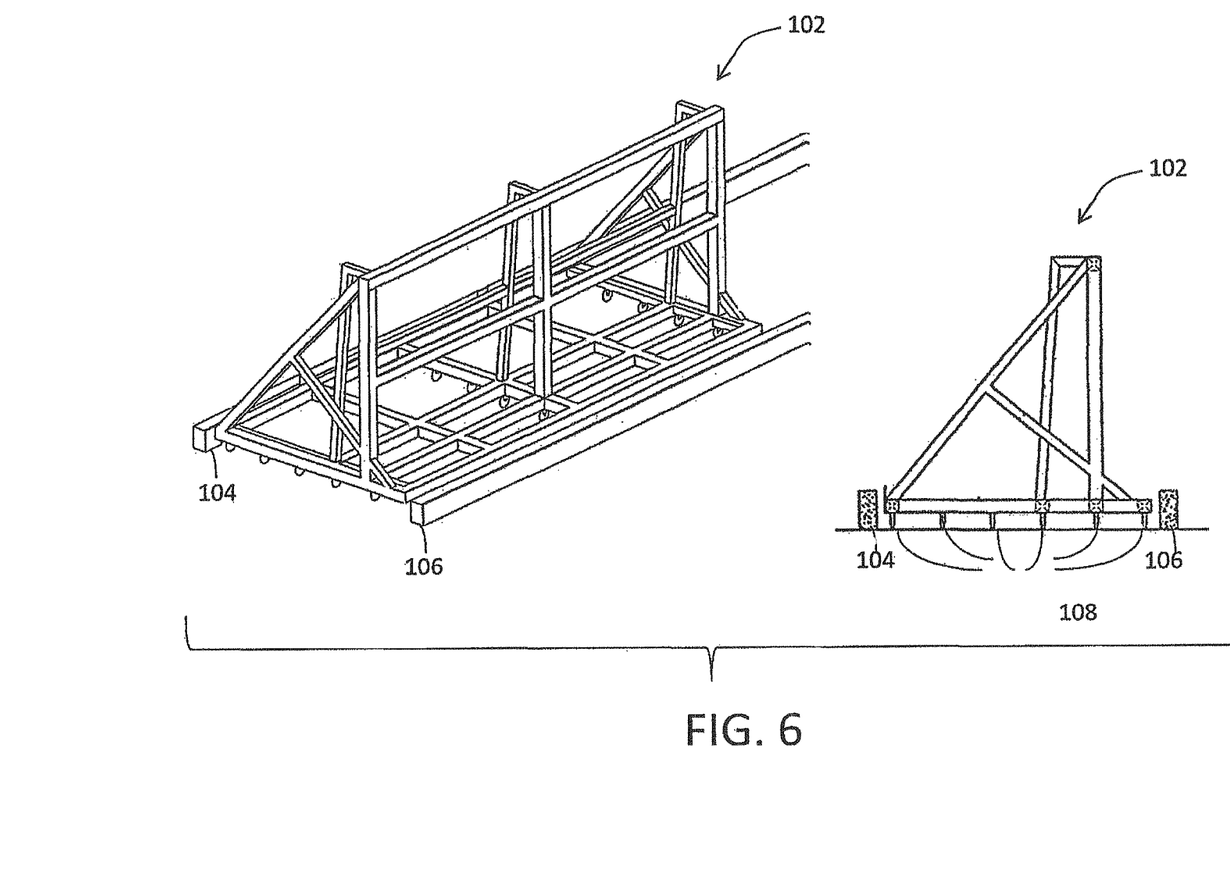
FIG. 6 illustrates another embodiment of an exemplary slab handling device.

FIG. 6 illustrates another embodiment of an exemplary slab handling device. The slab handling device 102 is generally similar in construction to the slab handling device as described in FIG. 1. However, the projection 18 is eliminated in this design and further, the set of track wheels are replaced with uniform side wheels all along. The wheels 108 are made from at least one of a heavy duty castor, or a hardened rubber. As a safety mechanism, the configuration illustrated in FIG. 6 includes at least two concrete curb, within which the slab handling device 102 is designated to move around.

Advantageously, the slab viewing and selection procedure such as selecting a marble/granite slab by a consumer is simplified by the proposed embodiments of the invention. Visiting an open yard and traveling over long distances over foot is avoided. Further, such viewing and selection experience for customers is made pleasurable within a pleasant viewing area and completely avoids danger from the snakes and insects in the open yard. Furthermore, a full viewing area of the sample is provided by the slab handling and transport system. Slab processing is simplified by implementing such transport and handling system as described in various embodiments of the invention. For example, as time consuming retrieval process of slabs for either viewing or for further processing is avoided. Further, handling of slabs provide safe work environment for employees in slab processing facilities. Also, the stacking of slabs provides more efficient time in retrieval and processing. Stock taking and inventory management also becomes efficient While only-certain features of the invention have been illustrated and described herein, many modifications and changes will occur to those skilled in the art. It is, therefore, to be understood that the appended claims are intended to cover all such modifications and changes as fall within the true spirit of the invention.

I claim:

1. A slab handling device for facilitating movement of slabs around a facility, the slab handling device comprising:
a base frame disposed horizontally in parallel to a floor surface, wherein a first end of the base frame comprises a projection extending from the base frame, the base frame comprising a grid of support structures to host a second frame disposed vertically on the base frame to form a viewing side and a stacking side, the second frame comprising a plurality of vertical support members, at least two or more diagonal support members coupled to the vertical support members, and one or more horizontal members coupled the vertical members;
a plurality of track wheels coupled to the base frame and configured to roll within a track when in motion;
a plurality of side wheels coupled to the base frame, wherein the diameter of the plurality of track wheels is greater than the diameter of the plurality of side wheels; and
a first set of end stoppers disposed on the base frame and configured to hold a slab in position on the viewing side;
a second set of end stoppers disposed on the base frame and configured to hold multiple slabs in place on the stacking side;
wherein the grid of support structures are made from materials having hollow cross-section, and configured to support slabs disposed thereon while the slab handling device is in motion or at rest.

2. The slab handing device as recited in claim 1 further coupled to a drive mechanism configured to move the slab handling device on the track disposed around the facility.

3. The slab handling device as recited in claim 2, wherein the drive mechanism is further configured to move and stop the slab handling device.

4. The slab handling device as recited in claim 1, wherein the plurality of track wheels is made from at least one selected from the group consisting of a heavy duty castor, and a hardened rubber.

5. The slab handling device as recited in claim 1, wherein the base frame is configured to accommodate one or more slabs on the viewing side and a plurality of slabs on the stacking side.

6. The slab handling device as recited in claim 1, wherein the projection extending from the base frame is configured as a stopper for the base frame and the second frame from tripping due to overload.

7. A slab handling and transport system comprising:
a plurality of slab handling devices for facilitating movement of slabs around a facility, wherein each slab handling device comprising a base frame disposed horizontally in parallel to a floor surface, wherein a first end of the base frame comprises a projection extending from the base frame, the base frame comprising a grid of support structures to host a second frame disposed vertically on the base frame to form a viewing side and a stacking side, the second frame comprising a plurality of vertical support members, at least two or more diagonal support members coupled to the vertical support members, and one or more horizontal members coupled to the vertical members; a plurality of track wheels coupled to the base frame and configured for rolling; a plurality of side wheels coupled to the base frame, wherein the diameter of the plurality of track wheels is greater than the diameter of the slab in position on the viewing side; a second set of end stoppers disposed on the base frame and configured to hold multiple slabs in place on the stacking side; wherein the plurality of slab handling devices are coupled together to form a transport train; and
a track disposed around the facility comprising a central production area, a viewing area, and a loading-unloading bay, wherein the plurality of slab handling devices are configured to move continuously on the track and around the central production area, the viewing area and the loading-unloading bay seamlessly;

wherein the stacking side of each slab handling device is generally aligned towards the central production area and the viewing side of the each slab handling device is generally aligned towards the viewing area.

8. The slab handling and transport system as recited in claim 7, wherein the transport train is configured to move and stop on the track.

9. The slab handling and transport system as recited in claim 8, wherein the each slab handling device is configured to store inventory of slabs and to display slabs at the viewing area.

* * * * *